Aug. 29, 1967  J. R. HOLLINS  3,338,357
BRAKE-OPERATED ACCELERATOR RELEASE
Filed May 4, 1964
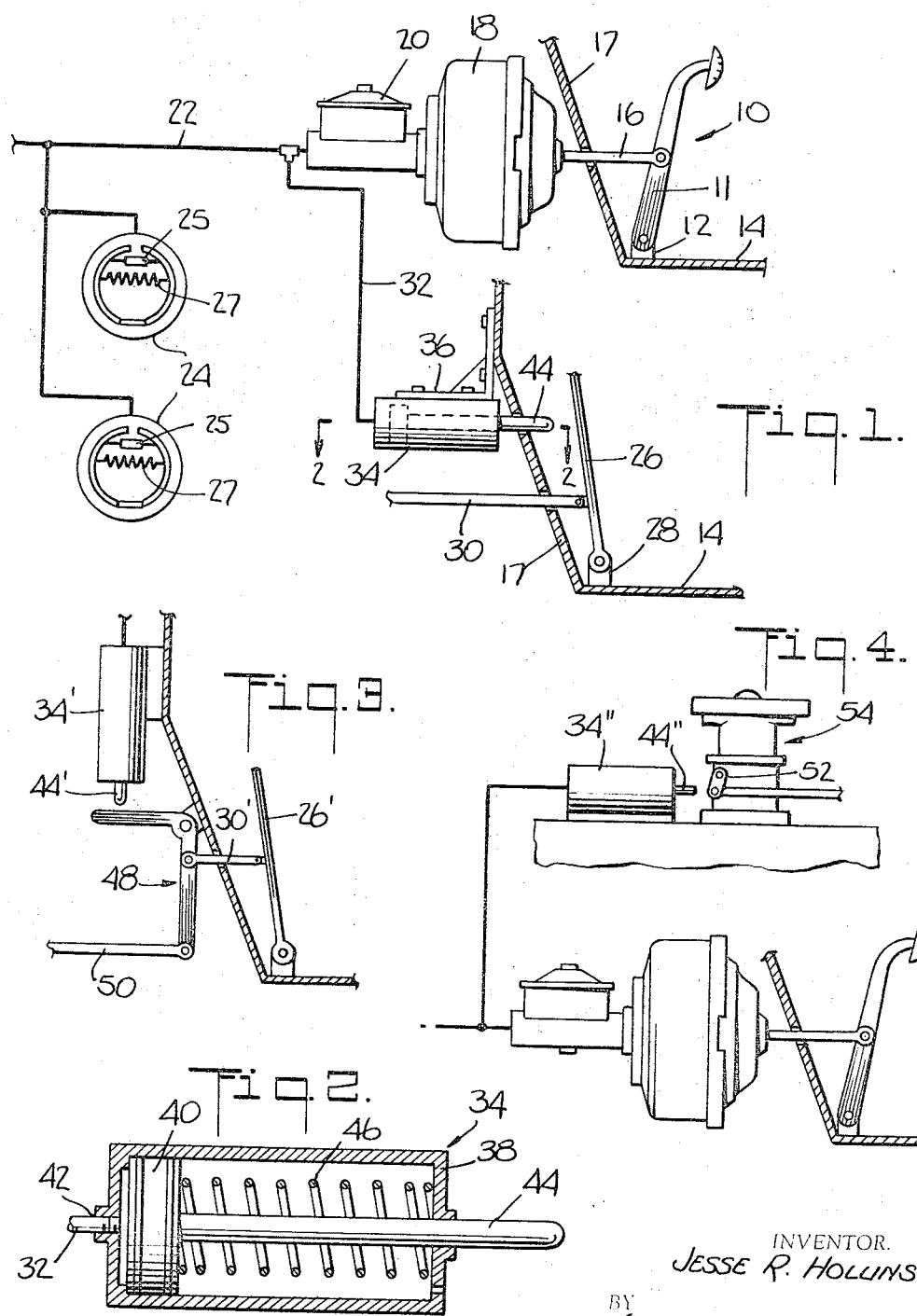
INVENTOR.
JESSE R. HOLLINS
BY
ATTORNEYS

United States Patent Office 3,338,357
Patented Aug. 29, 1967

3,338,357
BRAKE-OPERATED ACCELERATOR RELEASE
Jesse R. Hollins, 1059 E. 22nd St.,
Brooklyn, N.Y. 11210
Filed May 4, 1964, Ser. No. 364,560
4 Claims. (Cl. 192—3)

This invention relates to a brake-operated accelerator override for use on automotive vehicles.

With the introduction of automatic transmissions in motor vehicles, vehicle operators have found their left feet freed from operating a clutch pedal. With the elimination of the clutch pedal vehicle manufacturers have introduced a wider (transversely extending) brake pedal. Although the wider brake pedal extended principally toward the right side of the brake pedal arm which brought it closer to the accelerator (fuel control) pedal, drivers who no longer had to use their left feet for operating a clutch began to experiment with using their left feet for the purpose of applying the automobile brakes while their right feet remained on the accelerator pedal.

A lively controversy has developed among highway safety officials, motor vehicle administrators, auto manufacturers and driver training instructors as to the advantages and disadvantages of utilizing the driver's left foot for braking the automobile. It has been effectively argued that if a driver uses his left foot for applying the vehicle brakes while reserving his right foot for use on the accelerator pedal, valuable time is saved by eliminating the necessity of transferring the right foot from the accelerator pedal to the brake pedal at times of emergency. Thus, the vehicle could be stopped more quickly and in a shorter distance. Studies have shown that in a car traveling thirty miles an hour stoppage of the vehicle can be attained thirteen feet sooner by the use of the left foot applied to the brake pedal, rather than the right foot.

Although the foregoing advantages are undisputed, the application of the left foot to the brake pedal in present conventional automobiles has a very danger aspect and has caused serious accidents. It should be noted that at about the time that vehicle manufacturers commenced the use of automatic transmissions, hydraulic power brakes, which increased the power that could be applied to the brakes by a driver of the vehicle, were also introduced. Furthermore, the power multiplication factor of hydraulic brakes increases with the speed of the engine of the vehicle. In addition, automatic transmissions prevent the vehicle engine from effectively acting as a brake on the power train when the vehicle is slowing down. Hence, when the driver applies his left foot to the power brake pedal while his right foot remains on the fuel accelerator pedal, even with the same foot pressure the brakes are applied more forcefully since at this time the engine is still operating at above idling speed and has not as yet had sufficient time to slow down. The increased power ratio at which the brakes are applied will tend to cause the brakes to grip and lock the wheels of the vehicle. As a result, the body of the vehicle pitches forwardly and may throw the occupants forwardly off their seats and against the windshield or other parts of the vehicle, causing serious injury. In addition, the driver is apt to try to correct this sudden stopping action, and in so doing is likely to lose control of his vehicle by the car going into a skid or by losing control over the steering apparatus of the vehicle. Worst of all, a frightened driver is likely to freeze on both pedals in such an emergency and the depression of the gas accelerator pedal will cause the vehicle to lurch forward again. Indeed, the application of the brakes will tend to shift the operator forwardly so as to depress the accelerator pedal.

Safety records indicate that vehicles with automatic transmissions and power brakes have been involved in serious accidents wherein the driver has suddenly lost control of the vehicle. Investigations of the circumstances of these accidents have revealed that the vehicles were in perfect operating condition just prior to the accidents and that there were no evident mechanical failures which caused the accidents. Although such accidents have been regarded as having loss of control of vehicle by the driver as their cause, it is most likely that the drivers of such vehicles suddenly applied pressure to the brakes with their left feet while their right feet were still applying pressure to the gas accelerator pedals.

It is an object of my invention to provide a safety control utilizing both the braking system and the fuel accelerator, which control will operate automatically, i.e., without intervention by the driver, and which will overcome the foregoing disadvantages resulting from the use of automatic transmissions, hydraulic power systems and wider brake pedals.

It is another object of my invention to provide a brake-operated accelerator override safety control which is placed into operation by depression of the brake pedal and which, upon such depression, will force the accelerator or equivalent fuel control member to its engine idling position, overcoming any force applied to such member by the foot of the driver.

In accordance with my invention, I provide a fluid operator, e.g., hydraulic cylinder, having a reciprocable piston which is spring-biased to a normally retracted position. An elongated rod is fixed to the piston for concurrent movement and extends out through one end of the cylinder. The hydraulic cylinder and the rod are positioned adjacent the fuel control member so that a stroke of the piston will move the rod against the fuel control member and will force the fuel control member to its engine idling position. In retracted position the rod is clear of the fuel control member so that this member is free to be moved by the vehicle operator to any desired engine speed-up position.

The hydraulic cylinder is connected by a hydraulic line to the outlet from the vehicle master brake cylinder, and preferably taps the hydraulic line which extends to the brake units of the vehicle. When the brake pedal is depressed, hydraulic fluid from the master brake cylinder enters the hydraulic cylinder and shifts the piston so that the rod pushes against the fuel control member, forcing this member to its aforementioned engine idling position. The spring within the hydraulic cylinder exerts less pressure than that exerted by the springs that load the wheel brake cylinders in the brake units, so that the hydraulic piston will act prior to the wheel brake cylinders and thus prior to the application of any braking force to the vehicle. Hence, the driver, by applying his brakes, first forces the fuel control member to its engine idling position, consequently decreasing the fuel supplied to the engine, and only then applies braking force to his automobile. It is, of course, obvious that the accelerator override will be put into operation regardless of whether braking is effected by the right foot or the left foot of the operator. The danger of having the brakes applied at the same time that more than an idling level of fuel is fed into the automobile engine is thus eliminated.

The foregoing and various other objects and advantages of my invention will become apparent to the reader in the following description.

My invention accordingly consists in the features of construction, combinations of elements and arrangements of parts which will be exemplified in the devices hereinafter described and of which the scope of application will be indicated in the appended claims.

In the accompanying drawings in which are shown various possible embodiments of my invention, FIG. 1 is a schematic view of my brake-operated accelerator override;

FIG. 2 is an enlarged axial sectional view of the hydraulic cylinder taken substantially along the line 2—2 of FIG. 1;

FIG. 3 is another schematic view illustrating an alternative location for the hydraulic cylinder in connection with another type of accelerator linkage; and FIG. 4 is another schematic view illustrating my accelerator override mounted to act directly on the carburetor throttle lever.

Referring now in detail to the drawings, and particularly to FIG. 1, the reference numeral 10 denotes a brake pedal of the type which is conventional in modern-day automobiles. The brake pedal 10 is pivotally mounted at its lower end on a hinge 12 on the floorboard 14 of the automobile. This mounting is typical of the mountings used for brake pedals, but it is understood that brake pedals mounted in any manner can be utilized with my invention. The brake pedal may be wide in accordance with present-day practice, being extended to the right side of the brake pedal arm 11.

As is further well known and conventional, a control link 16, pivotally connected at one of its ends to the brake pedal, extends through an aperture in the firewall 17 of the automobile to a vacuum-mechanical power unit 18 that operates a master brake cylinder 20. A primary hydraulic line 22 extends from the master cylinder to the hydraulic wheel brake units 24 of the automobile of which only two are shown.

Further, as is conventional in modern automobiles a gas accelerator 26 is similarly mounted at its lower end on a hinge 28 on the floorboard 14 of the automobile to the right of the brake pedal. A mechanical connecting link 30 one end of which is pivotally connected to the accelerator pedal 26 extends to and is mechanically connected directly or through a conventional linkage to the throttle lever on the carburetor of the automobile.

It is obvious and therefore need only be mentioned briefly that depression of the brake pedal 10 by a foot of the driver moves the control link 16 of the vacuum-mechanical power unit 18 which multiplies the input force so as to greatly increase the hydraulic pressure within the master brake cylinder 20. The output hydraulic pressure from the master brake cylinder then appears in the hydraulic line 22 and actuate the wheel brake cylinders 25 so as to expand the brake shoes and apply the brakes 24 of the automobile. When the accelerator 26 is in its engine idling position, i.e., when no foot pressure is applied thereto and the accelerator is most remote from the firewall 17 as illustrated in FIG. 1, the throttle lever of the carburetor is lightly biased to an engine idling position by a standard restoring spring, so that a minimum of fuel is fed into the automobile engine. When the accelerator 26 is depressed by the foot of the operator to any selected speed-up position, the linkage 30 by moving the throttle lever of the carburetor increase the quantity of the fuel supplied, so that the engine speeds up.

As thus far described, the brake and fuel systems are conventional and have been mentioned only to the extent necessary to appreciate their cooperation with the additional components added pursuant to my invention.

In accordance with the teaching of my invention, I provide a secondary hydraulic line 32 which taps the primary hydraulic line 22 that leads from the master brake cylinder 20 to the brake units 24. This secondary hydraulic line leads to a hydraulic cylinder 34 anchored, as by an L-shaped bracket 36, on the firewall interior face adjacent the accelerator 26.

The construction of the hydraulic cylinder 34 is illustrated most clearly in FIG. 2. As shown therein, the hydraulic cylinder includes an elongated closed cylinder housing 38 of uniform circular cross-section within which a piston 40 is mounted for reciprocal movement. The secondary hydraulic line 32 leads into an input port 42 in one end wall of the housing through which hydraulic fluid is introduced to one side of the piston 40. The opposite end wall may be vented as shown.

An elongated piston rid 44 has one end fixed to the opposite side of the piston 40 and extends centrally through the cylinder housing 38 and sealing passes through an aperture in the opposite end wall of the cylinder housing. The piston rod 44 projects beyond the opposite end wall of the cylinder housing when the piston 40 is in its normally-retracted position shown in FIG. 2 adjacent the wall in which the supply port 42 is located. The cylinder is placed behind the firewall and the end of the rod external to the cylinder extends through an aperture in the firewall towards the back of the accelerator pedal.

A large compression coil spring 46 disposed internally of the cylinder housing 38 encircles the piston rod 44 and biases the piston 40 to its fully retracted position adjacent the supply port end wall, as illustrated in FIG. 2, so that the external end of the rod does not interfere with normal accelerator pedal movement. It may be mentioned that the coil spring 46 exerts less hydraulic pressure than do the springs 27 utilized with the wheel brake cylinders 25 in the brake units 24.

Upon depression of the brake pedal 10 by the foot of the vehicle operator, hydraulic pressure generated in the master cylinder by the power unit 18 forces hydraulic fluid from the master cylinder through the hydraulic lines 22, 32 and against one side of the piston 40. The hydraulic fluid causes the piston 40 to shift within the cylinder housing 38 and to extend the rod 44 further out of the cylinder housing and force it against the back of the accelerator pedal 26. As the piston 40 reaches the opposite cylinder end wall, the rod has forced the accelerator to its engine idling position, wherein minimum quantity of fuel is fed to the automobile engine. Since, as has been mentioned, the coil spring 46 exerts less hydraulic pressure than the springs 27 used with the wheel brake cylinders of the brake units 24, the cylinder 34 is actuated before the application of any effective braking force. Thereby, the piston rod 44 will force the accelerator 26 to its engine idling position before any braking force is applied to the vehicle. The pressure generated by the power unit 18 is sufficiently high so that the rod 44 will exert a force on the accelerator pedal sufficiently high to overcome any opposing force applied by the foot of the driver.

Where the accelerator pedal 26 is mounted in a different manner or at a different location, the position of the hydraulic cylinder 34 can be adjusted appropriately. By way of example, and as illustrated in FIG. 3, the accelerator pedal 26' is connected by a link 30' to a bell crank 48 pivotally mounted on the interior side of the firewall. The link 30' is pivotally mounted to one arm of the bell crank 48 and the hydraulic cylinder 34' is mounted so that the rod 44' moves vertically downwardly against the other arm of the bell crank. An appropriate linkage 50 leads from the bell crank to the throttle lever of the vehicle carburetor. Actuation of the cylinder 34' will move the accelerator 26' to its engine idling position. When the cylinder is deactuated its internal loading (retraction) spring will pull the rod back to a position clear of the associated arm of the bell crank lever in the latter's maximum speed position.

FIG. 4 illustrates another embodiment of my invention, wherein the hydraulic cylinder 34" acts directly on the throttle lever of the carburetor 54. Here, the hydraulic cylinder 34" is mounted on the engine block so that the rod 44" will abut the throttle lever 52 and move it to engine idling position when said cylinder is actuated. When in its retracted position, the rod 44" does not interfere with the normal operation of this lever.

It will now be evident to a reader of the instant disclosure who is skilled in the art that depression of the brake pedal 10 in any of the foregoing embodiments first causes the engine fuel feeding control member to be brought to its engine idling position so that a minimum quantity of fuel is fed to the automobile engine. Immediately thereafter, continued depression of the brake pedal 10 actuate the brake units 24 of the automobile in a conventional manner.

It thus will be seen that I have provided devices which achieve the several objects of my invention and which are well adapted to meet the conditions of practical use.

As various possible embodiments might be made of the above invention and as various changes might be made in the embodiments set forth, it is to be understood that all matter herein described or shown in the accompanying drawings is to be interpreted as illustrative and not in a limiting sense.

Having thus described my invention, I claim as new and desire to secure by Letters Patent:

1. For use in an automobile having an engine fuel feeding system, a braking system and a frame, in combination:

an engine fuel feeding means including a control member movable between an engine idling position and engine speed-up positions;

a liquid operator including a cylinder fixed to the automobile frame, a piston shiftable in the cylinder between a retracted position and an extended position, an extension fixed to the piston, a spring biasing the piston and piston extension to retracted position, the piston extension upon movement to extended position mechanically shifting the control member to its engine idling position and in retracted position being spaced from the control member;

the braking system including wheel brakes, each brake having a brake shoe, a wheel brake cylinder connected to the brake shoe and operable to force the shoe against a member rotatable with a wheel to brake the same and resilient loading spring means biasing the brake shoe away from braking position, a brake pedal, a master brake cylinder having an outlet supplying liquid under pressure upon depression of the brake pedal and a liquid containing conduit running from the outlet of the master cylinder to the brake cylinder and to the liquid operator to shift the piston and piston extension to extended position, the spring of the fluid operator exerting less hydraulic pressure than the resilient loading of the brake cylinders;

whereby when the brake pedal is depressed the liquid operator will force the control member to its engine idling position before the wheel brakes are operated.

2. The combination as set forth in claim 1 wherein a power unit is interposed between the brake pedal and the master brake cylinder to multiply the input force to said cylinder.

3. The combination as set forth in claim 1 wherein the control member of the engine fuel feeding means is an accelerator pedal, wherein a kinematic linkage connects said accelerator pedal to a lever system located forward of the firewall of the automotive vehicle and wherein the piston extension of the liquid operator is arranged to engage the lever system so as to shift the accelerator pedal to engine idling position when the piston member is in its extended position.

4. The combination as set forth in claim 1 wherein the control member of the engine fuel feeding means is a throttle lever of a carburetor.

References Cited
UNITED STATES PATENTS

| | | | |
|---|---|---|---|
| 2,065,354 | 12/1936 | Streen | 192—3 |
| 2,203,777 | 6/1940 | Detmers | 192—3 |
| 2,229,055 | 1/1941 | Dick. | |
| 2,317,935 | 4/1943 | Myerson | 192—3 |
| 2,642,165 | 6/1953 | Banker | 192—3 |
| 2,662,622 | 12/1953 | Rodeback | 192—3 |
| 2,982,382 | 5/1961 | Strauss | 192—3 |

BENJAMIN W. WYCHE, III, *Primary Examiner.*

DAVID J. WILLIAMOWSKY, *Examiner.*